Figure 1:
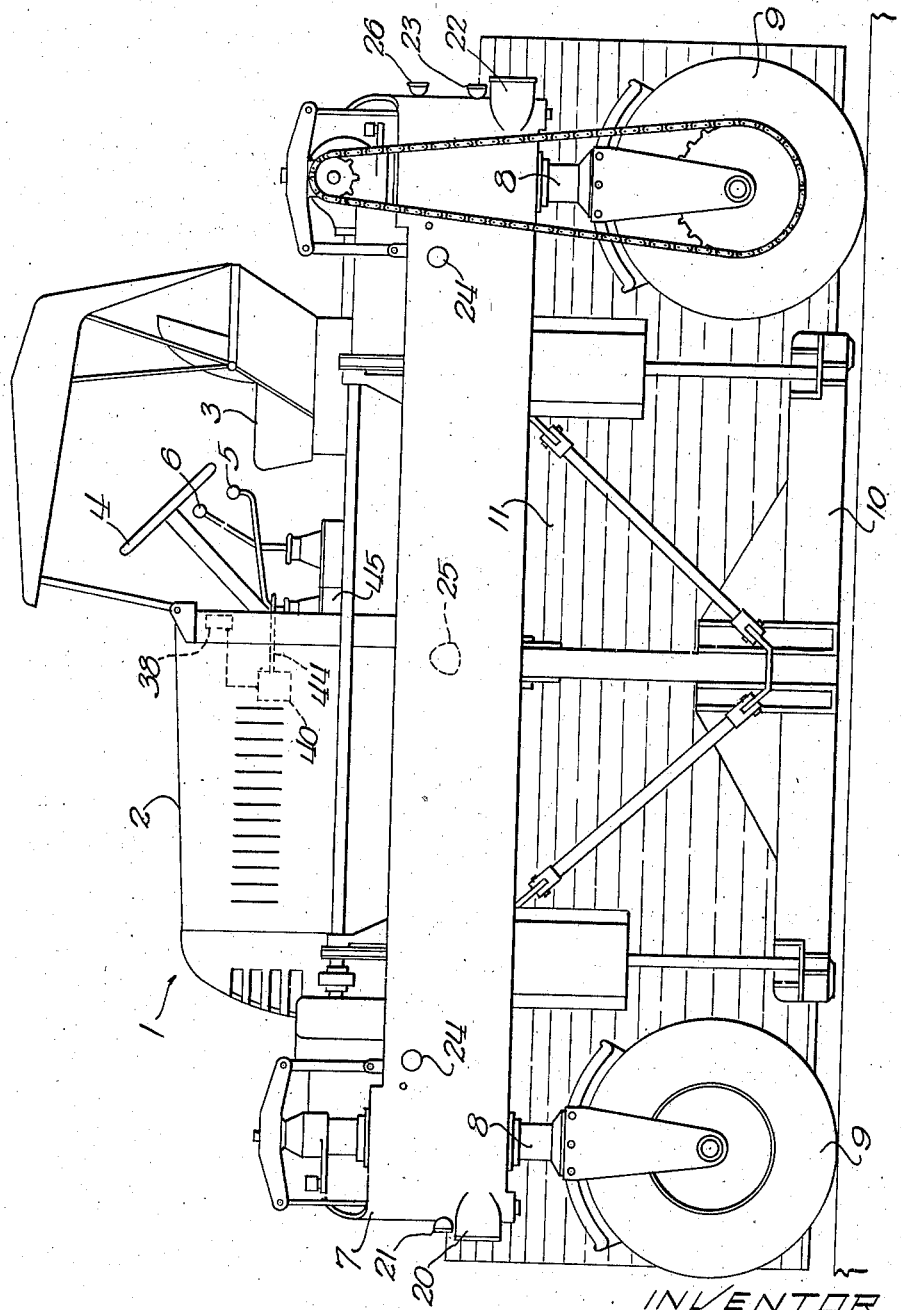

Nov. 9, 1948.                H. N. DIMICK                2,453,415
                         VEHICLE LIGHTING SYSTEM

Filed July 24, 1945                                    2 Sheets-Sheet 1

INVENTOR
Henry N. Dimick
BY
Harold D. Cook
ATTORNEY

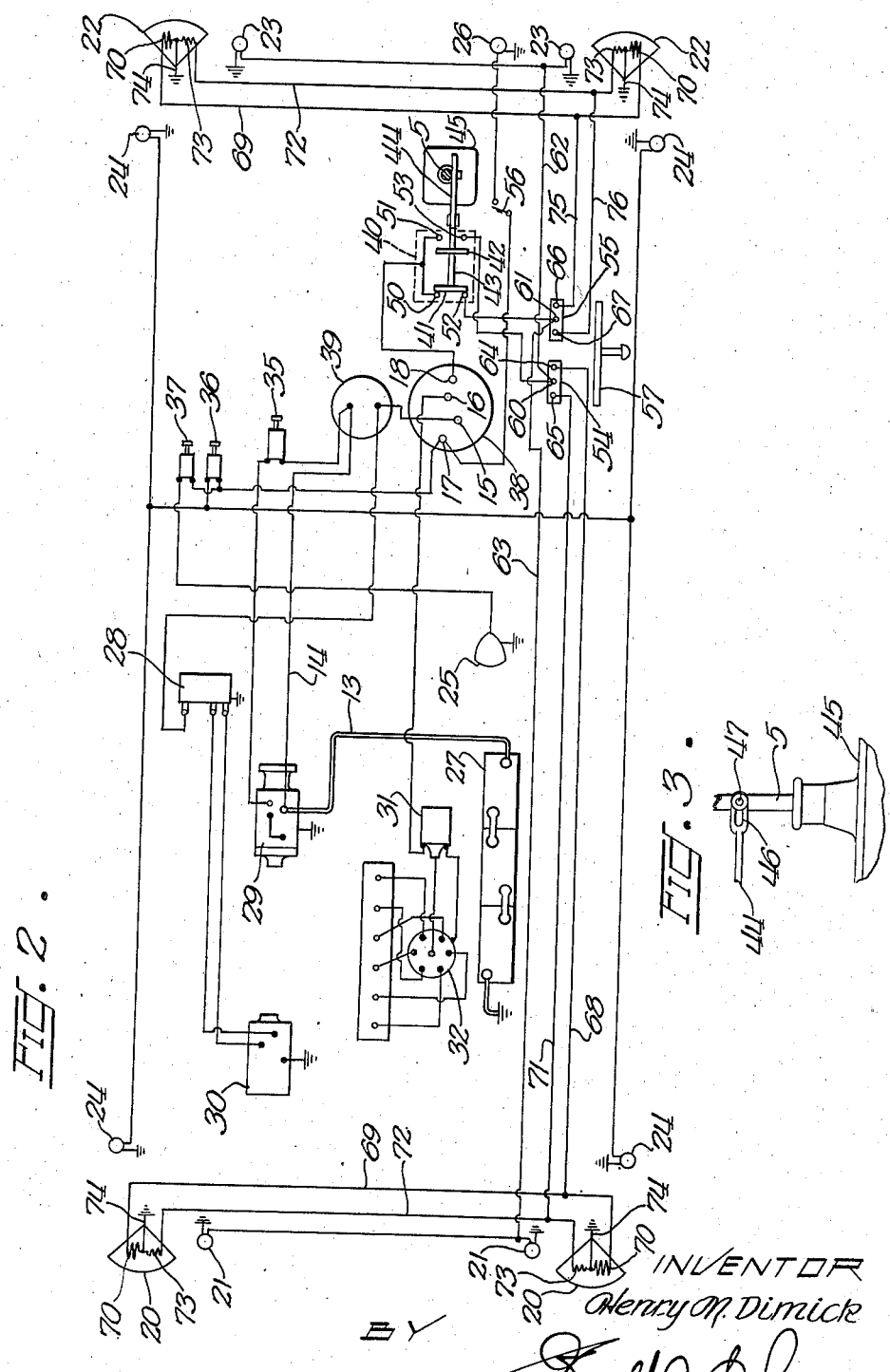

Patented Nov. 9, 1948

2,453,415

UNITED STATES PATENT OFFICE 2,453,415

VEHICLE LIGHTING SYSTEM

Henry N. Dimick, Portland, Oreg., assignor to Hyster Company, Portland, Oreg., a corporation of Oregon Application July 24, 1945, Serial No. 606,786

1 Claim. (Cl. 315—80)

This invention relates to a novel lighting system for vehicles of the type provided with complete headlight and tail light equipment at each end for traveling in both directions.

Certain classes of vehicles such as straddle trucks used in lumber yards are driven back and forth on short hauls so as to be in reverse approximately half the time, making it necessary to duplicate the head and tail light equipment on each end of the vehicle. The object of the present invention is to provide a novel lighting system responsive to shifting of the reversing gear for simultaneously and automatically lighting head lights on the leading end of the truck and lighting tail lights on the trailing end whenever the truck reverses its direction of travel. The purpose of such an automatic lighting system is not only to relieve the driver of continually manipulating the lighting switch while maneuvering with heavy loads of lumber and the like, but also to serve as a safety feature for fellow workmen. Such a vehicle constitutes a particular hazard to fellow workmen because the driver is perched high in the air where his view of immediate surroundings is obstructed by the load carried under the truck chassis. Automatically controlled headlights and tail lights on such a vehicle to indicate the direction in which the truck is traveling or about to travel contribute greatly to the safety of the workmen as well as to the convenience of the driver.

A particular object of the invention is to provide a duplicate lighting system controlled by a switching mechanism operable by the reversing gear shift lever to switch on headlights and tail lights in the proper combination for the gear in which the lever is placed, and to maintain the lights lighted in such combination when the gear shift is returned to neutral and until the lever is moved to engage a different gear.

These and other objects will become apparent as the description proceeds in connection with the accompanying drawings, in which:

Figure 1 is a side elevational view of a loaded straddle truck to which the present invention is applied, Figure 2 is a wiring diagram of the lighting system employed in the truck shown in Figure 1, and Figure 3 is a fragmentary view showing the mechanical connection between the reversing transmission lever and the light switch.

The reference numeral 1 refers to a typical lumber yard straddle truck having an engine hood 2, a driver's seat 3, steering wheel 4, and gear shift levers 5 and 6. The chassis carrying these parts is associated with a heavy frame 7 mounted for vertical movement on wheel posts 8 carrying road wheels 9. The frame 7 supports a carrier mechanism 10 for picking up and carrying a load of lumber or the like 11 directly beneath the vehicle chassis and between the wheels. Such a load ordinarily extends considerably to the front and rear of the vehicle so as to obstruct the view fore and aft from the driver's seat 3.

The truck is provided with numerous lights identified as headlights 20 and tail lights 21 on one end of the truck, headlights 22 and tail lights 23 on the other end of the truck, clearance lights 24, a load light 25, and a stop light 26. The usual storage battery 27 furnishes the electrical supply for these various lights and is also connected with other conventional electrical equipment such as voltage regulator 28, starter 29, and generator 30. The ignition system is represented by the coil 31 and distributor 32.

In this electrical system the switch 35 controls the starter, and switches 36 and 37 control the clearance lights and load light, respectively. All these lights, however, are also under the additional control of a master switch device 38 in series with the ammeter 39, which switch device also provides for manually turning the head and tail lights on and off. The various circuits for the electrical system are shown in the wiring diagram of Figure 2. From battery 27 the supply for the lighting and ignition circuits may be traced through battery cable 13 and wire 14 to the ammeter 39, and thence to terminal 15 of the switch device 38. Switching elements 33 and 34 are provided therein for connecting the terminal 15 with the ignition terminal 16 and lighting terminals 17 and 18. The terminal 17 connects with the load, clearance and stop light circuits which are controlled by their respective individual switches. The terminal 18, when connected with terminal 15, energizes the automatic control circuit for the head and tail lights, these circuits being completed through ground connections at the individual lights.

Automatic control of the head and tail lights in the manner described is accomplished by a switch 40 having a pair of movable contactors 41 and 42 mounted on an insulating rod or plunger 43. The rod 43 is externally connected with a link 44 having a pivotal lost motion connection with the reversing gear shift lever 5 on a reversing transmission 45. The lost motion connection preferably comprises a slot 46 in the end of the link 44 slidable on a pivot 47 attached to the shift lever 5. The amount of lost motion in the slot 46 is sufficient to allow the shift lever to return to neutral from either forward or reverse positions without moving the link 44, but to require the movement of the link 44 when the shift lever 5 is advanced to a different gear meshing position. The details of the lost motion connection are best shown in Figure 3.

In the switch 40, a pair of stationary contacts 50 and 51 are connected with the terminal 18 of the master switch 38 so as to be energized whenever the lights are turned on at the master switch. These stationary contacts are paired with other stationary contacts 52 and 53, respectively, which are connected by circuit wires shown in Figure 2 through dimmer switches 54 and 55 to the headlights 20 and 22, respectively. The tail lights are connected into the system so that the tail lights 23 are energized with the headlights 20 and the tail lights 21 are energized with the headlights 22. The stop light 26 is independently controlled by a brake switch 56.

It will be observed that when the gear shift lever 5 is moved forwardly to the conventional reverse position, the bridging contactor 41 will engage the stationary contacts 50 and 52 to energize headlights 22 and tail lights 21 through the connections at the dimmer switch 55 for reverse movement of the truck. When the shift lever 5 is moved rearwardly for a forward drive, the contactor 41 will disengage its stationary contacts and the contactor 42 will then engage the stationary contacts 51 and 53. This will complete a circuit through the connections at dimmer switch 54 for the headlights 20 and the tail lights 23 for forward motion of the truck. The lost motion connection on the link 44 enables the shift lever 5 to be returned to neutral from either of these gear meshing positions without moving the switch plunger 43. When the shift lever is moved through and beyond the neutral position the lost motion is taken up, causing the link 44 to throw the switch simultaneously with the meshing of a different gear. The plunger 43 preferably has a snap action so that it will always definitely be in one position or the other and will not come to rest at an intermediate open circuit position.

The dimmer switches 54 and 55 are preferably actuated in unison by a single mechanical operator. These switches, shown schematically in Figure 2, are each of the conventional single pole, double throw type having a spring returned plunger operator in the floor board to reverse the position of a movable switch element 77 each time the plunger is depressed. The switch 54 is operated by the plunger 58 and the switch 55 is operated by the plunger 59, these plungers being disposed side by side to be depressed simultaneously by an overlying bar or plate 57. Terminals 60 and 61 in these switches are connected with the stationary contacts 53 and 52, respectively, and also with wires 62 and 63 leading to the respective sets of tail lights 23 and 21. High and low beam terminals 64 and 65 are shown on the switch 54, the switch 55 having similar high and low beam terminals 66 and 67, the two switches being so coordinated in installation that they both will shift to high or low beam position at the same time. That is to say that if one set of headlights is operating on high beam, actuation of switch 40 will then turn off those headlights and turn on the other set of headlights, also on high beam. Operation of the dimmer switches by bar 57 will change both of these switches to low beam position so that whichever set of headlights may be selected from time to time by switch 40 will operate on low beam until the bar 57 is again depressed.

The circuits for headlights 20 are completed through wires 68 and 69 for energizing high beam filaments 70 and through wires 71 and 72 for energizing low beam filaments 73, these filaments in each headlight having a common ground connection indicated at 74. The headlights 22 are similarly provided with high beam filaments 70 and low beam filaments 73 connected with wires 69 and 72 extending between the two headlights. Wires 75 and 76 connect the high and low beam circuits with the high and low beam terminals 66 and 67 on the dimmer switch 55. The tail light connections 62 and 63 are crossed so that tail lights 23 come on with either the high or low beam circuits to headlights 20, and tail lights 21 come on with either the high or low beam circuits to headlights 22. The headlights 20 and 22 cannot be lighted simultaneously, nor can the tail lights 21 and 23 be lighted simultaneously.

Thus, the present system automatically switches the lights on the vehicle when the gears are shifted so as to relieve the driver of this duty in back and forth maneuvering, and to avoid the hazard of inadvertently moving in the dark and possibly injuring workmen who were unaware of the presence of the truck or who had assumed it to be moving in the opposite direction. Whenever the driver shifts to neutral the lights remain as they were before shifting to neutral. If the driver wishes to stop the truck and then reverse the lights to see behind him, he need only manipulate the gear shift lever and then return it to neutral and the lights will remain changed. If he then wishes to go forward again, the lights will come on in front as soon as he shifts into a forward gear.

Having now described my invention and in what manner the same may be used, what I claim as new and desire to protect by Letters Patent is:

In a reversible lumber yard straddle truck vehicle having a single operator's station but adapted to travel a substantial part of its operating time in reverse gear, a single reversing lever at said operator's station having forward, neutral and reverse positions, a first head and tail light system including a dimmer switch for forward travel, a second head and tail light system including a second dimmer switch for reverse travel, a single manually operable member at said operator's station for operating both of said dimmer switches simultaneously to dim the headlights in operation regardless of the direction of travel, a common switch at said operator's station for energizing one or the other of said lighting systems, a lost motion link connected with said reversing lever to operate said common switch to energize said first lighting system for forward travel when said lever is moved from neutral to a forward position and to maintain said first lighting system energized when said lever is returned to neutral position, said link operating said common switch to deenergize said first lighting system only when said lever is moved from neutral to reverse position and then to energize said second lighting system for reverse travel and maintain said second lighting system energized when said lever is returned to neutral position, said second lighting system being deenergized only by movement of said lever from neutral to a forward position, and an independent switch at said operator's station for connecting both of said lighting systems with a source of electrical supply subject to the control of said common switch, whereby either one of said lighting systems may be left energized while said vehicle is standing with said reversing lever in neutral position for illumination at either end of said truck and as a warning to workmen.

HENRY N. DIMICK.

REFERENCES CITED

The following references are of record in the file of this patent:

UNITED STATES PATENTS

| Number | Name | Date |
|---|---|---|
| 1,105,035 | McMurtry | July 28, 1914 |
| 1,381,723 | Makoben | June 14, 1921 |
| 1,695,846 | Harding | Dec. 18, 1928 |